Feb. 22, 1927.
H. B. FAIRCHILD
1,618,373
RADIUS ROD CLAMP
Filed July 10, 1924
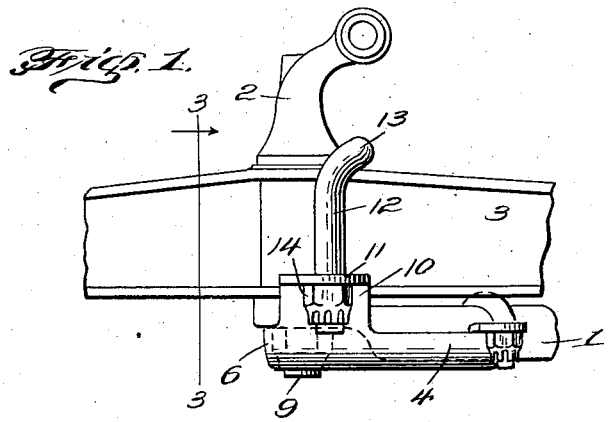
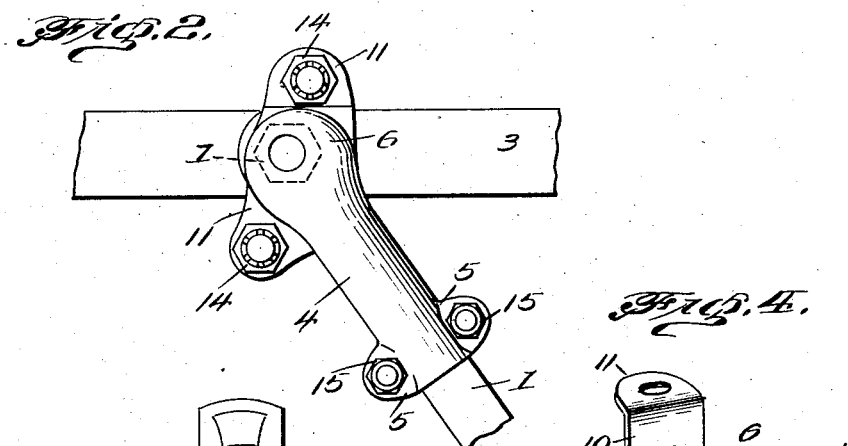
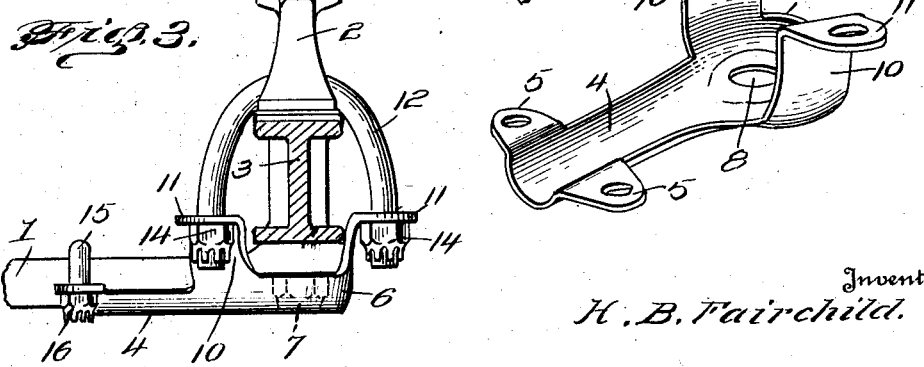
Inventor
H. B. Fairchild.
By Townshend + Townshend
Attorney Patented Feb. 22, 1927.

1,618,373

UNITED STATES PATENT OFFICE.

HULON B. FAIRCHILD, OF SANFORD, MISSISSIPPI.

RADIUS-ROD CLAMP.

Application filed July 10, 1924. Serial No. 725,284.

My invention relates to the radius rod construction on automobiles of the Ford type, wherein the axle end of the rod is secured on the lower end of the front spring spindle.

Objects of the invention are to provide a clamp for radius rods which binds a rod in place and renders impossible its working loose; to provide a radius rod clamp serving at a seat or washer for holding the rod nut against rotation; to provide a radius rod clamp designed to support a rod in connection with an axle irrespective of its connection with a spring spindle; and to provide a clamp of this character wherein working of the rod relative to its connection is prevented.

With these, and such other objects in view as will be apparent from the description, the invention resides in the novel construction, combination and arrangement of parts hereinafter described and claimed, and illustrated in the accompanying drawings, of which:—

Figure 1 is a front elevation of a portion of an axle with a rod and clamp attached thereto;

Figure 2, a bottom plan view thereof;

Figure 3, a vertical section on line 3—3 of Figure 1, and

Figure 4, a perspective view of the clamp.

The clamp is shown as applied over a radius rod 1 secured in the usual manner at its end to the lower end of a front spring spindle 2 mounted in a front axle 3, and comprises a stamped metal blank formed with a semi-cylindrical shank 4 having lateral apertured ears 5 at one end thereof and an enlarged head 6 at the opposite end.

The shank 4 is adapted to be disposed under a radius rod with the enlarged head disposed beneath the castle nut 7 by which the rod is connected to the spring spindle, an aperture 8 being provided in the blank for reception therethrough of the lower end 9 of the spindle. Extending from opposite sides of the head 6 is a pair of relatively high upright arms 10 carrying laterally offset flanges 11 at their upper ends apertured to receive therethrough the ends of a U-bolt 12 disposed over the top of the axle 3 and bent at its central portion, as at 13, to accommodate the spring spindle 2. Castle nuts 14 are threaded on the lower ends of the arms of the U-bolt beneath the flanges 11 to bind the clamp in position. In general formation, the enlarged head 6 of the blank, is substantially cup shaped and of dimensions sufficient to encompass and enclose the castle nut 7 of the rod connection, so that when the clamp is applied, the nut 7 will be nested within the head 6 and the walls of the cup shaped head will engage the corners of the nut sufficiently to prevent rotation thereof.

A smaller U-bolt 15 is disposed over the top of the radius rod with its ends passed through the apertures in the flanges 5 of the shank 4, being secured therebeneath by castle nuts 16 to bind the shank to the rod.

By this construction the possibility of a radius rod becoming loose and dropping down is absolutely eliminated, as the clamp supports the rod in position irrespective of its connection. Furthermore, the engagement of the rod nut 7 with the walls of the cup shaped head 6 of the clamp, prevents rotation of the nut and thereby eliminates play in the connection and loosening of the nut.

While I have illustrated castle nuts as the preferred form of connections, other means may be employed, and such other changes may be made in the structural details of the invention as will fall within the scope thereof as claimed.

I claim:—

1. A radius rod clamp comprising a metal blank formed with a shank to extend under and engage one end of a radius rod, an enlarged head on said blank for engagement with the rod securing nut, integral lateral ears on said shank and head, and U-bolts passed over said rod and axle for engagement through said ears for clamping said blank in position.

2. A radius rod clamp comprising a stamped metal blank having a shank formed to engage under a portion of a radius rod, an enlarged cup shaped head on one end of said shank to engage under a rod securing nut at its connection with an axle, bolt flanges on said shank and head, and U-bolts adapted to be disposed over the rod and axle for engagement in said flanges for clamping said blank beneath the rod and axle.

In testimony whereof I affix my signature.

HULON B. FAIRCHILD.